United States Patent
Ishibashi

(10) Patent No.: US 8,082,395 B2
(45) Date of Patent: Dec. 20, 2011

(54) PORTABLE ELECTRONIC DEVICE

(75) Inventor: Norio Ishibashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 326 days.

(21) Appl. No.: 12/403,774

(22) Filed: Mar. 13, 2009

(65) Prior Publication Data

US 2010/0161913 A1   Jun. 24, 2010

(30) Foreign Application Priority Data

Dec. 19, 2008   (JP) ................................. 2008-324631

(51) Int. Cl.
*G06F 12/00*   (2006.01)

(52) U.S. Cl. ................. 711/115; 711/158; 711/E12.069
(58) Field of Classification Search .................... 711/115
See application file for complete search history.

(56) References Cited

U.S. PATENT DOCUMENTS

| | | | |
|---|---|---|---|
| 3,699,530 A | | 10/1972 | Capowski et al. |
| 5,126,541 A | * | 6/1992 | Shinagawa .................... 235/438 |
| 5,517,014 A | | 5/1996 | Iijima |
| 6,676,022 B1 | | 1/2004 | Guthery et al. |
| 6,824,064 B2 | | 11/2004 | Guthery et al. |
| 2002/0029343 A1 | | 3/2002 | Kurita |
| 2005/0188120 A1 | | 8/2005 | Hayden et al. |
| 2006/0088049 A1 | | 4/2006 | Kastein et al. |
| 2006/0259665 A1 | | 11/2006 | Agarwala et al. |
| 2008/0017711 A1 | | 1/2008 | Adams et al. |
| 2008/0022043 A1 | | 1/2008 | Adams et al. |
| 2008/0028109 A1 | | 1/2008 | Kamada |
| 2008/0077720 A1 | | 3/2008 | Fanning |

FOREIGN PATENT DOCUMENTS

| | | |
|---|---|---|
| EP | 1 544 809 | 6/2005 |
| JP | 2005-011147 | 1/2005 |
| JP | 2007-206895 | 8/2007 |
| WO | WO 2004/029860 | 4/2004 |

OTHER PUBLICATIONS

Singapore Search Report dated Aug. 24, 2009 for Appln. No. 200901444-0.
European Search Report dated Sep. 9, 2009 for Appln. No. 09002739.2-2221.
Rankl et al.; "Handbuch der Chipkarten"; 1999, Hanser, Germany XP002533774; pp. 219-233, pp. 238-245, pp. 390-391 and pp. 397-407; XP002533525.
Anonymous; "Smart Cards—Standards: ISO/IEC 7816 Part 4: Inter-industry Command for Interchanged" Nov. 26, 1998; pp. 1-64; XP002533524.
European Search Report dated Feb. 18, 20011.

* cited by examiner

*Primary Examiner* — Reginald Bragdon
*Assistant Examiner* — Hamdy S Ahmed
(74) *Attorney, Agent, or Firm* — Pillsbury Winthrop Shaw Pittman, LLP

(57) ABSTRACT

In an IC card, an operating system manages the access order of each channel for each file using a channel management table. An application controls access to each file based on the access order managed in the channel management table. The channel management table stores, as an access order, an order that each logical channel has set a file in a current state. If current setting by a specific logical channel is canceled, a table updating function deletes the logical channel from the channel management table and moves up the access order of each logical channel next to the deleted logical channel.

6 Claims, 4 Drawing Sheets

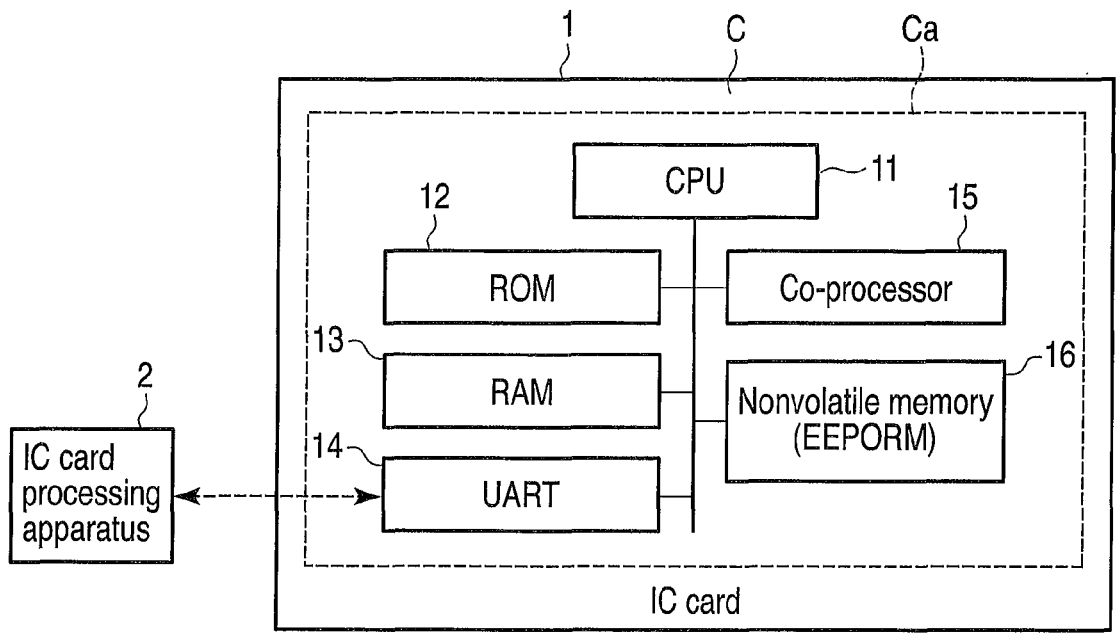
F I G. 1
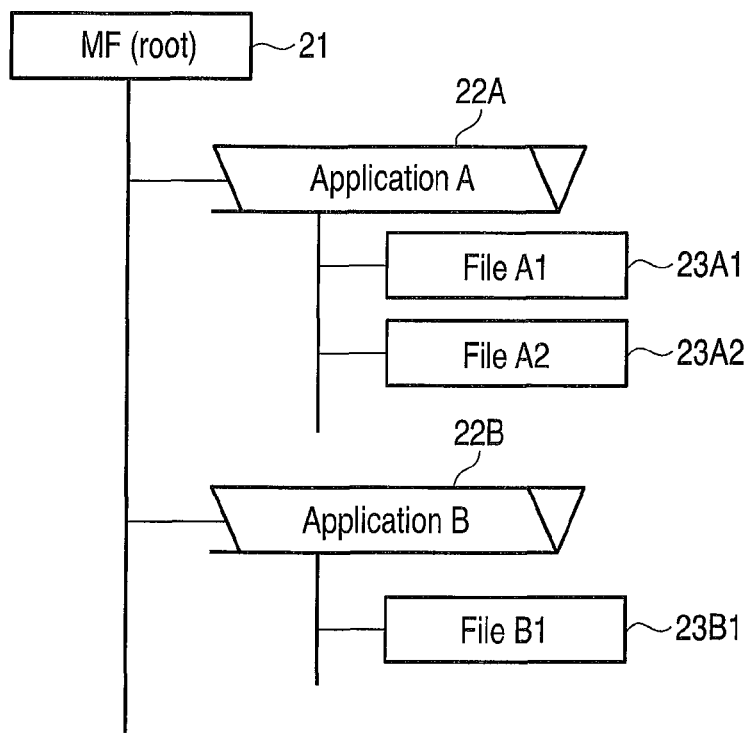
F I G. 2

| Application/file | Access order |
|---|---|
| Application A | Ch.1, Ch.3, Ch.0 |
| File A1 | Ch.1, Ch.3 |
| File A2 | |
| Application B | Ch.2 |
| File B1 | |

42a

| Application/file | Access order |
|---|---|
| Application A | Ch.1, Ch.3, Ch.0, Ch.2 |
| File A1 | Ch.1, Ch.3, Ch.2 |
| File A2 | |
| Application B | |
| File B1 | |

| Application/file | Access order |
|---|---|
| Application A | Ch.3, Ch.0, Ch.2 |
| File A1 | Ch.3, Ch.2 |
| File A2 | |
| Application B | |
| File B1 | |

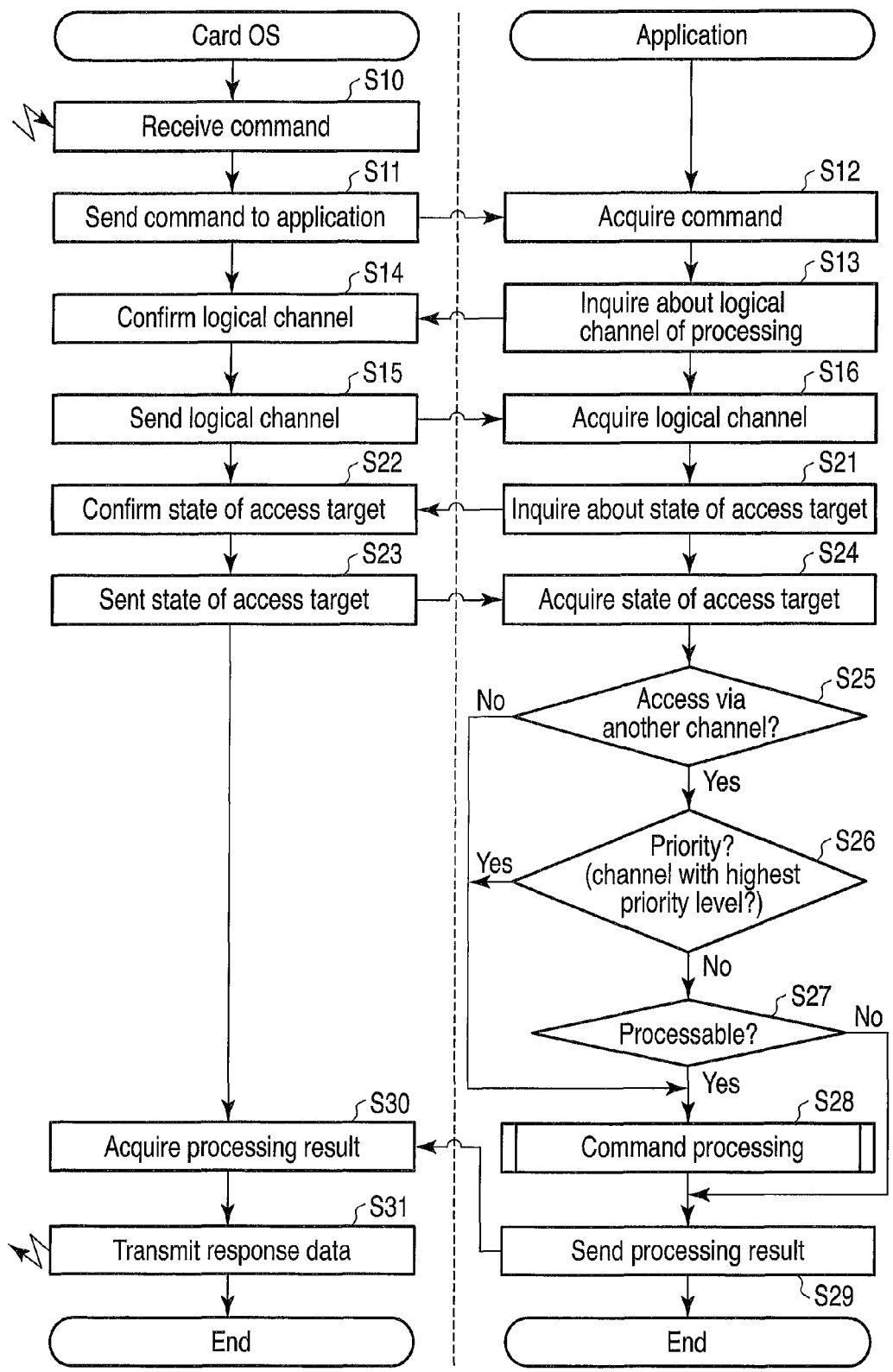
F I G. 7

PORTABLE ELECTRONIC DEVICE

CROSS-REFERENCE TO RELATED APPLICATIONS

This application is based upon and claims the benefit of priority from prior Japanese Patent Application No. 2008-324631, filed Dec. 19, 2008, the entire contents of which are incorporated herein by reference.

BACKGROUND OF THE INVENTION

1. Field of the Invention

The present invention relates to a portable electronic device such as an IC card which incorporates a module having a nonvolatile memory capable of data write and rewrite and a control element such as a CPU, and executes processing corresponding to an externally input command.

2. Description of the Related Art

A conventional example of a portable electronic device is an IC card which is formed by embedding an IC module having functions of, e.g., a memory and a CPU in a shell in the form of a plastic card. Such an IC card writes data in a rewritable nonvolatile memory or reads data from it in accordance with a command from an external device. The IC cards are used in various fields such as access control, credit card, cellular phone, and electronic commerce from the viewpoint of the importance of security. In many recent operation forms, one IC card is used for various kinds of application purposes by running a plurality of applications.

In general, data exchange between an IC card and a host device (terminal) is performed via a "channel for communication" which is called a logical channel. In a general operation form, since an IC card and a terminal conventionally perform one-to-one communication, processing is completed using only one channel. However, in many recent cases, one IC card communicates with a plurality of terminals. This has occurred because the basic performance of IC cards has improved, or IC cards having a plurality of interfaces (e.g., contact type, noncontact type, or high-speed contact type) to external devices are growing in number. To communicate with a plurality of terminals, an IC card sets up a plurality of channels and controls to make each channel access its target file (or application).

However, in the current IC card, access to a file is managed not for each of the plurality of channels. That is, the conventional IC card can unconditionally access a file via the plurality of channels. If unconditional access from the plurality of channels to each file is possible, various problems arise in the IC card. For example, a file which is being accessed via a first channel may be rewritten via a second channel. Such a phenomenon makes it impossible to implement processing expected in the first channel.

BRIEF SUMMARY OF THE INVENTION

It is an object of an aspect of the present invention to provide a portable electronic device capable of reliably and efficiently controlling access using a plurality of channels.

According to an aspect of the present invention, there is provided a portable electronic device a first memory which stores an operating system program; a second memory which stores an application program;

a third memory which stores a file;

a channel management unit which causes the operating system program to manage a plurality of channels to access the file stored in the third memory;

an access order management unit which manages, as an access order, an order that each channel managed by the channel management unit has set the file stored in the third memory in a current state;

an access order updating unit which, if a first channel managed by the channel management unit cancels the current state of the file stored in the third memory, excludes the first channel from an access order management target for the file and moves up the access orders of all channels next to the first channel;

a providing unit which provides, to the application program which is going to access the file stored in the third memory, data representing the access order of each channel for the file; and an access control unit which controls access to the file via a channel to which the operating system program has assigned the application program which has received the data representing the access order from the providing unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing the hardware configuration of an IC card serving as a portable electronic device according to an embodiment of the present invention;

FIG. 2 is a view showing an example of the file structure of data stored in a nonvolatile memory;

FIG. 5 is a view showing another example of the arrangement of the channel management table to manage the channel access order;

FIG. 6 is a view showing still another example of the arrangement of the channel management table to manage the channel access order; and FIG. 7 is a flowchart for explaining an example of processing of the IC card for a command.

DETAILED DESCRIPTION OF THE INVENTION

Figures 3, 4:
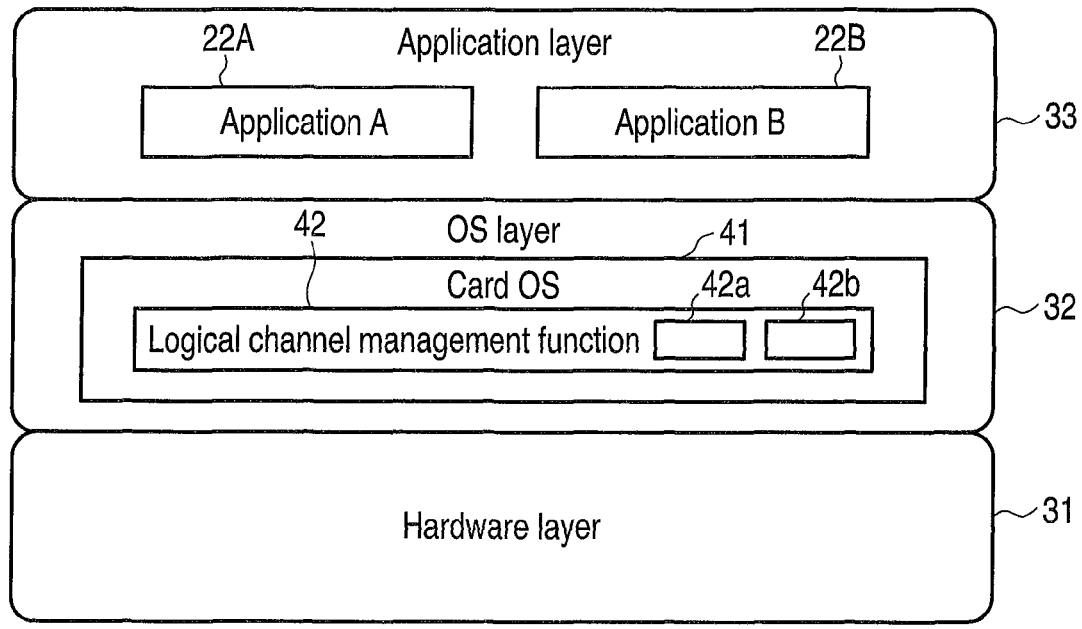
FIG. 3 is a schematic view for explaining the software configuration of the IC card.
FIG. 4 is a view showing an example of the arrangement of a channel management table to manage the channel access order.

The best mode for carrying out the present invention will now be described with reference to the accompanying drawing.

FIG. 1 schematically shows the hardware configuration of an IC card 1 serving as a portable electronic device according to the embodiment.

As shown in FIG. 1, the IC card 1 includes a central processing unit (CPU) 11, read-only memory (ROM) 12, random access memory (RAM) 13, communication unit (UART) 14, co-processor 15, and nonvolatile memory (NV [EEPROM]) 16.

The CPU 11, ROM 12, RAM 13, communication unit 14, co-processor 15, and nonvolatile memory 16 are included in a module Ca integrally formed as, e.g., an integrated circuit. The module Ca is embedded in a card C which forms the IC card 1. That is, the IC card 1 is formed from the case C having the module Ca embedded.

Upon receiving power supplied from an IC card processing apparatus 2 serving as a host device, the IC card 1 is activated (becomes operative) and operates in accordance with a command from the IC card processing apparatus 2.

The CPU 11 is responsible for overall management and control. The CPU 11 functions as a processing means or a determination means. The CPU 11 operates based on, e.g., a control program to perform various kinds of processing. The ROM 12 is a nonvolatile memory which stores control programs and control data in advance. The RAM 13 is a volatile memory functioning as a working memory.

The communication unit 14 functions as a communication means and controls data communication with the IC card processing apparatus 2 serving as a host device. The communication unit 14 also functions as a means for receiving power necessary for the operation of the IC card 1. The co-processor 15 assists in operations such as encryption and decryption. The nonvolatile memory 16 is a rewritable nonvolatile memory for storing various kinds of data and applications (application programs). The structure of data stored in the nonvolatile memory 16 will be described later in detail.

The communication unit 14 has an arrangement conforming to the communication method of the IC card 1. If the IC card 1 uses a contact communication method, the communication unit 14 includes a contact unit to physically contact the contact unit of the IC card processing apparatus 2 serving as a host device. In this case, the IC card 1 receives power from the IC card processing apparatus 2 via the communication unit 14 that is in physical contact with the IC card processing apparatus 2. More specifically, when the IC card 1 is a contact IC card, it is activated upon receiving operation power and operation clocks from the IC card processing apparatus 2 via the contact unit of the communication unit 14.

If the IC card 1 uses a noncontact (wireless) communication method, the communication unit 14 includes an antenna to transmit/receive radio signals, and a communication control unit to control communication. In this case, the IC card 1 causes a power supply unit (not shown) to generate operation power and operation clocks based on a radio signal received by the communication unit 14. More specifically, when the IC card 1 is a noncontact IC card, it is activated by receiving a radio signal from the IC card processing apparatus 2 via the antenna and the communication control unit of the communication unit 14 and causing the power supply unit (not shown) to generate operation power and operation clocks based on the radio signal.

The structure of data stored in the nonvolatile memory 16 will be described next.

The nonvolatile memory 16 stores various kinds of data having a file structure defined by, e.g., ISO/IEC 7816. For example, the nonvolatile memory 16 stores files (elementary file [EF]) serving as data files managed in a multilayer structure (tree structure) and files (dedicated file [DF]) serving as data folders.

FIG. 2 is a view showing an example of the file structure stored in the nonvolatile memory 16.

In the example shown in FIG. 2, the top is a file (master file [MF]) 21 serving as a master file. A DF (application A) 22A and a DF (application B) 22B, which serve as folders, are provided under the MF 21. An EF (file A1) 23A1 and an EF (file A2) 23A2, which are used to store data, are provided under the DF (application A) 22A. An EF (file B1) 23B1 used to store data is provided under the DF (application B) 22B. In this file structure, various kinds of data are stored in the EFs serving as data files.

The software configuration of the IC card 1 will be described next.

In the IC card 1, the CPU 11 executes programs stored in the ROM 12 or the nonvolatile memory 16, thereby implementing various kinds of processing, as described above. More specifically, the ROM 12, RAM 13, nonvolatile memory 16, UART 14, and co-processor 15 are controlled by software executed by the CPU 11 to implement various kinds of processing.

FIG. 3 is a view schematically showing the software configuration of the IC card 1. The software of the IC card 1 includes a hardware layer 31, operating system (OS) layer 32, and application layer 33. As shown in FIG. 3, in the IC card 1, the application layer 33 is located at the top, and the OS layer 32 is located above the hardware layer 31.

The hardware layer 31 includes hardware such as the CPU 11, ROM 12, RAM 13, UART 14, co-processor 15, and nonvolatile memory 16. Each hardware device of the hardware layer 31 executes processing in response to a processing request from the OS layer 32 and sends the result of the executed processing to the OS layer 32.

The OS layer 32 has a card operating system (OS) 41 serving as a program to execute fundamental control of the IC card 1. The OS layer 32 may have modules such as a configuration module and an application interface group. The software serving as the card OS 41 is a program which controls the basic operation of the IC card 1. The program controls each hardware device of the hardware layer 31 or runs upon receiving data such as a processing result from each hardware device. The software serving as the card OS 41 is stored in the nonvolatile memory such as the ROM 12 of the IC card in advance.

The card OS 41 has a logical channel management function 42 in addition to the basic function of controlling each hardware device of the hardware layer to implement the basic operation of the IC card 1. This function manages logical channels to access a file or application in the nonvolatile memory 16. For example, if a plurality of communication methods are used for communication, a logical channel is assigned to each communication method. The control using such logical channels allows the IC card 1 to process a plurality of command groups via the respective channels. For example, application A can process commands via a first channel, and application B can process commands via a second channel.

The logical channel management function 42 manages the logical channels. More specifically, the logical channel management function 42 controls open and close of a logical channel, assigns a logical channel to an application program, or manages the access order of logical channels to a file or application using a channel management table 42a. A table updating function 42b updates data stored in the channel management table 42a when a current file or application program set for a logical channel has changed.

The application layer 33 includes various applications (applications A, B, . . . ) serving as programs to implement various kinds of processing. Software serving as an application includes programs and data to implement various kinds of processing corresponding to the operation form of the IC card 1. The software serving as the application is stored in the nonvolatile memory 16 of the IC card 1 in advance, or downloaded from an external device as needed and stored in the nonvolatile memory 16 of the IC card 1.

That is, each hardware device of the hardware layer 31 is controlled by the card OS 41 of the OS layer 32. The card OS 41 of the OS layer 32 controls the operation of each hardware device in response to a request from each application of the application layer 33. The processing result of each hardware device of the hardware layer 31 is supplied to the application via the card OS 41 of the OS layer 32. For example, a command from an external device is received by the hardware of the hardware layer 31 and supplied to the card OS 41 of the OS layer 32. The card OS 41 selectively supplies the command received by the hardware layer 31 to a specific application of the application layer 33.

For example, if the hardware layer 31 receives an application selection command from an external device, the card OS 41 sets the application in the application layer 33 designated by the application selection command in a current state. If the hardware layer 31 receives a command from the external device in this state, the card OS 41 supplies it to the application in the current state. The application of the application layer 33 executes processing corresponding to the command supplied from the card OS 41 of the OS layer 32. That is, the card OS 41 designates an application in a current state (to be also referred to as a current application hereinafter) and supplies a command to the current application.

The logical channel management function 42 will be described next.

FIGS. 4 to 6 are views showing examples of the arrangement of the channel management table 42a.

As shown in FIGS. 4 to 6, the channel management table 42a stores a logical channel access order for each of the applications and files. That is, each access order stored in the channel management table 42a is data representing the order (order of access) of logical channels which have set a file or application in the current state.

Each item of data stored in the channel management table 42a is updated by the table updating function 42b as needed. For example, if a new logical channel is opened, the table updating function 42b adds the logical channel to a file or application to be set in the current state by the logical channel. In this case, the access order of the logical channel to the current file or application is set next to the logical channel in access (that is, the access order is set at the end). If an existing logical channel is closed, the table updating function 42b deletes the logical channel from the channel management table 42a. In this case, the table updating function 42b deletes the logical channel from the channel management table 42a, and moves up the access orders of all logical channels next to the deleted logical channel.

Processing of causing the table updating function 42b to add a logical channel to the access orders stored in the channel management table 42a will be described.

In the channel management table 42a shown in FIG. 4, application A is set as a current application for logical channels "ch.1", "ch.3", and "ch.0" in this order. File A1 is set as a current file for the logical channels "ch.1" and "ch.3" in this order. That is, in the channel management table 42a shown in FIG. 4, the logical channel "ch.1" sets application A and file A1 in the current state. In the channel management table 42a shown in FIG. 4, a logical channel "ch.2" sets application B as a current application.

Assume that in the channel management table 42a shown in FIG. 4, the logical channel "ch.2" selects file A1 of application A (the logical channel "ch.2" sets application A and file A1 in the current state). In this case, the table updating function 42b changes the state of the channel management table 42a to that shown in FIG. 5.

More specifically, when the current file of the logical channel "ch.2" changes to file A1 of application A, the table updating function 42b deletes the logical channel "ch.2" from the access order for application B in the channel management table 42a, and adds the logical channel "ch.2" to the end of the access order for each of application A and file A1 in the channel management table 42a. With this processing, the channel management table 42a represents that the last logical channel which has set application A and file A1 in the current state is "ch.2", as shown in FIG. 5. According to the channel management table 42a shown in FIG. 5, the access order of the logical channel "ch.2" to file A1 can be determined to be next to the logical channels "ch.1" and "ch.3".

Processing of causing the table updating function 42b to delete a logical channel from the access orders stored in the channel management table 42a will be described next.

Assume that the logical channel "ch.1" is closed in the channel management table 42a shown in FIG. 5. In this case, the table updating function 42b deletes the closed logical channel "ch.1" from the channel management table 42a (excludes the logical channel "ch.1" from the management target), thereby changing the state of the channel management table 42a to that shown in FIG. 6.

More specifically, when the logical channel "ch.1" is closed, the table updating function 42b deletes the logical channel "ch.1" from the channel management table 42a, and moves up the access orders of the logical channels next to the logical channel "ch.1". For example, in the channel management table 42a shown in FIG. 5, the logical channel "ch.1" set at the top of the access order for each of application A and file A1 is deleted. In the channel management table 42a, the access order for application A represents the logical channels "ch.3", "ch.0", and "ch.2", and the access order for file A1 represents the logical channels "ch.3" and "ch.2", as shown in FIG. 6.

As described above, the access order for each application or file in the channel management table 42a represents the order of current setting by the logical channels. If a logical channel is closed, or the current setting of a logical channel is changed, the access order of each logical channel changes. In other words, the IC card 1 can change the access order of each logical channel in the channel management table 42a by closing or opening a specific channel or changing the current setting of each logical channel.

More specifically, if a specific logical channel is closed, the closed logical channel is excluded from the management target of the channel management table 42a, and the access orders of the remaining logical channels move up. This implements management without inconsistency in application or file access by the logical channels even when a logical channel is closed. In other words, it is possible to set the access order of a specific logical channel at the end by closing or opening it.

The processing of the IC card 1 for a command from the IC card processing apparatus 2 will be described next.

The logical channel management function 42 of the card OS 41 notifies each application of the number of a channel which is executing processing, or notifies each file or application of the priority level (access order) of each logical channel based on the above-described channel management table 42a. This enables each application that has received a command to determine the process contents corresponding to the command based on data representing the priority level provided from the card OS 41.

Each application receives a command from the IC card processing apparatus 2 via the card OS 41. In this case, the application determines based on the priority level of its logical channel whether to execute processing corresponding to the received command. The application may determine based on the priority level of its logical channel and the type of the received command whether to execute processing corresponding to the command. That is, whether to execute the received command is determined based on data representing the access order (priority level) of the logical channel which is provided from the card OS 41 to each application.

For example, if the logical channel of an application which has received a command has the highest priority level, the application determines that processes corresponding to any commands are executable. If the logical channel of an application which has received a command does not has the highest priority level, the application determines that processes corresponding to commands (e.g., rewrite and delete commands) to change the state of a file are not executable, but processes corresponding to commands (e.g., read command) not to change the state of a file are executable.

As described above, each application can determine the process contents (execution enable/disable state) for a received command. Hence, each application can implement not only the processes of the above-described example but also various processes to be described below.

For example, a specific application (application of the highest priority level) may always execute processes corresponding to all commands independently of the priority level of the logical channel. Alternatively, except for a logical channel having a highest priority level, execution of processes corresponding to all commands may be inhibited independently of the type of the received command. Otherwise, for, e.g., a specific file which sequentially stores log entries, write processing may be permitted independently of the priority level of the logical channel.

As described above, the IC card 1 can freely design the process contents corresponding to a command for each application if the current setting comes into competition with another logical channel, and implement a very flexile system conforming to the operation form or the like.

FIG. 7 is a flowchart for explaining an example of processing for a command from the IC card processing apparatus 2. The operations of the card OS 41 and applications are implemented by the CPU 11. In the following processing example, the operation of the card OS 41 and those of the applications 22 (22A, 22B, . . . ) will separately be explained.

When the UART 14 receives a command from the IC card processing apparatus 2 (step S10), the card OS 41 executed by the CPU 11 sends the received command to an application (application 22A in this example) (step S11).

Upon acquiring the command from the card OS 41 (sep S12), the application 22A inquires of the card OS 41 about its logical channel (step S13).

In response to this query, the card OS 41 causes the logical channel management function 42 to refer to the channel management table 42a and determine the logical channel of the application 22A (step S14). After determining the logical channel of the application 22A, the card OS 41 sends data representing the logical channel to the application 22A (step S15).

The application 22A confirms its logical channel. The method of making an application that has received a command confirm a logical channel assigned to it is not limited to the processes in steps S13 to S16. An application may confirm its logical channel directly from the CLASS byte of a received command, or acquire it based on dedicated API prepared in advance by the card specifications.

After the data representing its logical channel is acquired from the card OS 41, the application 22A determines the access target file of the command, and inquires of the card OS 41 about the access state of each logical channel for the access target file (step S21).

In response to this query, the card OS 41 causes the logical channel management function 42 to refer to the channel management table 42a and determine the access order (priority level) of each logical channel for the access target file (step S22). After determining the access order of each logical channel for the access target file, the card OS 41 sends, to the application 22A, data representing the access order of each logical channel for the file (step S23).

After the data representing the access order of each logical channel for the access target file is acquired (step S24), the application 22A determines whether to execute processing corresponding to the command (steps S25 and S26). More specifically, the application 22A determines whether there exists another logical channel which is accessing the access target file of the command (setting the file as a current file) (step S25).

Upon determining that no other logical channel is accessing the file (NO in step S25), the application 22A executes the processing corresponding to the command (step S28), and sends the processing result to the card OS 41 (step S29). Note that in the command processing in step S28, the application 22A implements, e.g., access to the memory that stores the file in cooperation with the card OS 41.

If it is determined that another logical channel is accessing the file (YES in step S25), the application 22A determines based on the data acquired from the card OS 41 and representing the access order of each logical channel whether the logical channel of its own has a priority for the file (step S26). For example, the application 22A determines whether its logical channel is at the top of the access orders of the logical channels acquired from the card OS 41, thereby determining whether the logical channel has a priority for the file.

Upon determining that the logical channel has a priority (YES in step S26), the application 22A executes processing corresponding to the command (step S28), and sends the processing result to the card OS 41 (step S29).

If it is determined that the logical channel has no priority (NO in step S26), the application 22A determines whether the command is executable (step S27). The determination in step S27 is done based on the settings of each application. For example, a form is possible in which commands associated with write are unexecutable, and commands associated with read are executable. Another form is also possible in which all commands are unexecutable, or all commands are executable. Alternatively, whether a command is executable may be determined based on the type of the access target file.

Assume that according to the settings of the application 22A, commands such as a rewrite command to change the state of a file are unexecutable, but other commands are executable. In this case, if the received command is a rewrite command, the application 22A determines that the processing of the command is unexecutable. If the received command is a read command, the application 22A determines that the processing of the command is executable.

Upon determining that the processing of the received command is executable (YES in step S27), the application 22A executes the processing corresponding to the command (step S28), and sends the processing result to the card OS 41 (step S29). Upon determining that the processing of the received command is unexecutable (NO in step S27), the application 22A inhibits (interrupts) the processing corresponding to the command, and sends data representing that the command corresponding to the command is interrupted to the card OS 41 as a processing result (step S29).

The card OS 41 receives the processing result for the received command from the application 22A (step S30), and transmits the processing result received from the application 22A to the IC card processing apparatus 2 as response data to the received command (step S31).

As described above, the card OS 41 of the IC card 1 manages each channel which sets a file in a current state and the access order of each channel. For a file an application is going to access in accordance with a received command, it is confirmed based on data provided from the card OS 41 "whether another channel has already set the target file as a current file" and "which channel has the access priority (access order)", thereby performing access control according to the current settings of a plurality of channels.

The above-described processing allows the card OS 41 to confirm, in command processing of a given application, whether another channel has already set the access target file as a current file. This makes it possible to reliably manage processing of files which are set as current files by a plurality of logical channels. It is therefore possible to implement reliable access control via a plurality of channels in the IC card 1 and attain a design corresponding to the operation form of each application.

That is, in the IC card of this embodiment, the operating system manages, using the channel management table, data representing each channel which is accessing a file stored in the nonvolatile memory, and refers to the data managed in the channel management table, thereby providing data representing a logical channel which is accessing the access target file of a received command to the application which is to process the command. The application determines based on the data provided from the operating system whether processing corresponding to the command is executable. This makes it possible to design process contents corresponding to a command for each application in accordance with the operation form or the like if the current setting (the file which is being accessed) comes into competition with another logical channel in access control of a plurality of logical channels.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IC Card comprising:
a first memory which stores an operating system program;
a second memory which stores an application program;
a third memory which stores a file;
a channel management unit which causes the operating system program to manage a plurality of channels to access the file stored in the third memory;
an access order management unit which manages, as an access order, an order that each channel managed by the channel management unit has set the file stored in the third memory in a current state;
an access order updating unit which, if a first channel managed by the channel management unit cancels the current state of the file stored in the third memory, excludes the first channel from an access order management target for the file and moves up the access orders of all channels next to the first channel;
a providing unit which provides, to the application program which is going to access the file stored in the third memory, data representing the access order of each channel for the file; and
an access control unit which controls access to the file via a channel to which the operating system program has assigned the application program which has received the data representing the access order from the providing unit.

2. The IC card according to claim 1, wherein the access control unit limits access to the file in accordance with the access order, for the file, of the channel assigned to the application program.

3. The IC card according to claim 2, wherein the access control unit accesses the file without limitation if the access order, for the file, of the channel assigned to the application program is set at a top.

4. The IC card according to claim 1, wherein the access control unit accesses the file without limitation if the access order, for the file, of the channel assigned to the application program is set at a top, and otherwise, uniformly places a limitation on the file.

5. The IC card according to claim 1, wherein when executing, for the file, processing to change a state of the file, the access control unit inhibits access to the file unless the access order, for the file, of the channel assigned to the application program is set at the top.

6. The IC card according to claim 1, wherein when executing, for an access target file, processing not to change the state of the file, the access control unit permits access to the access target file independently of the access order for the access target file.

* * * * *